Patented Aug. 28, 1928.

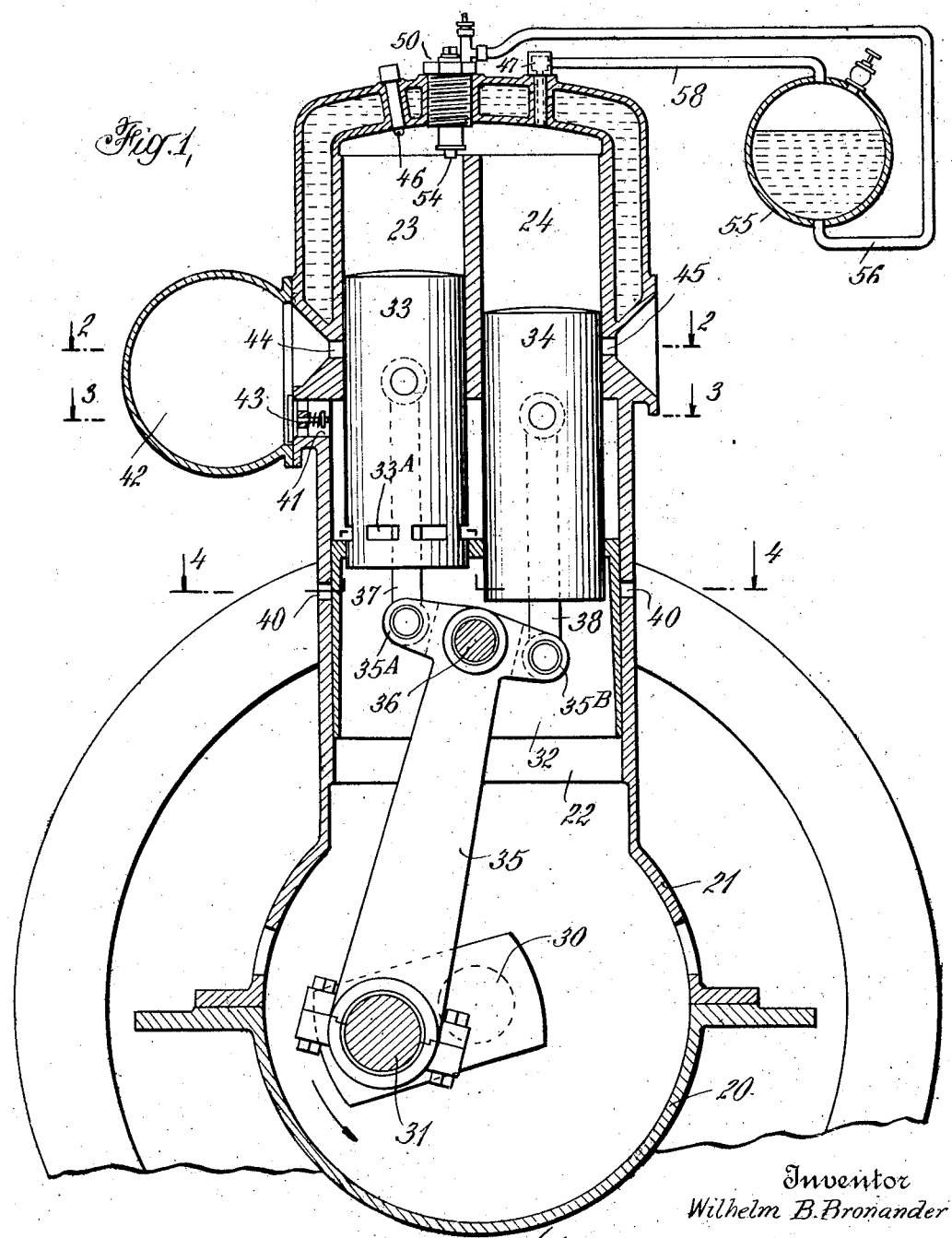

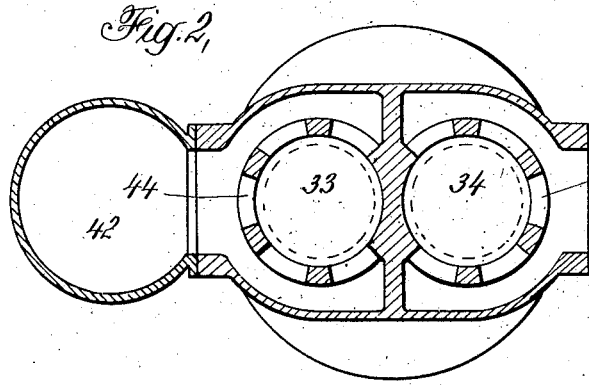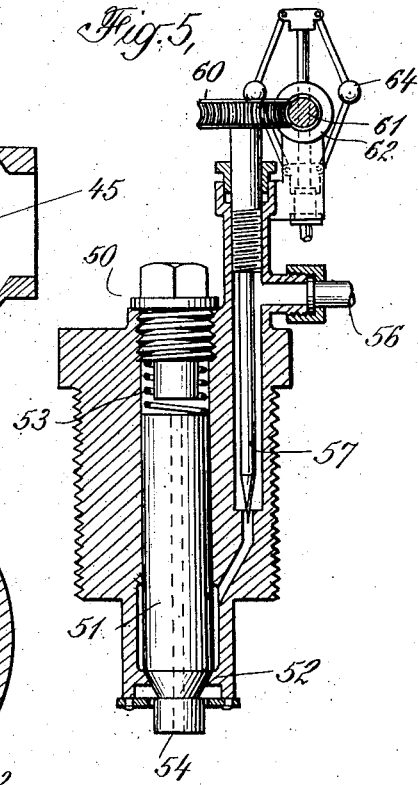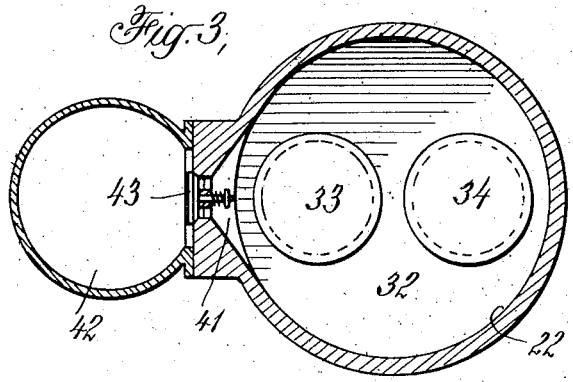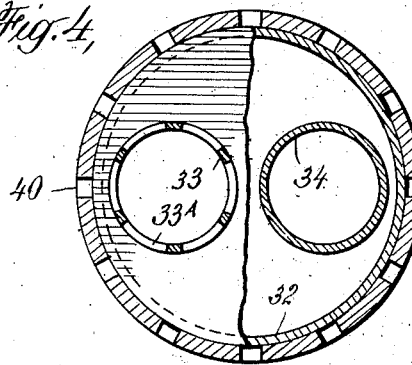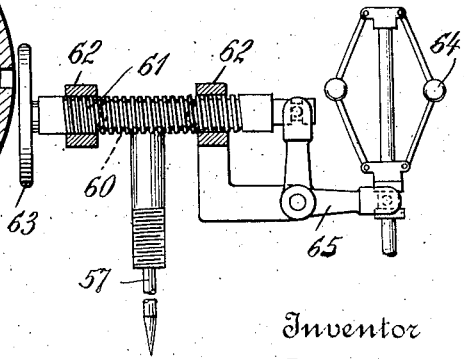

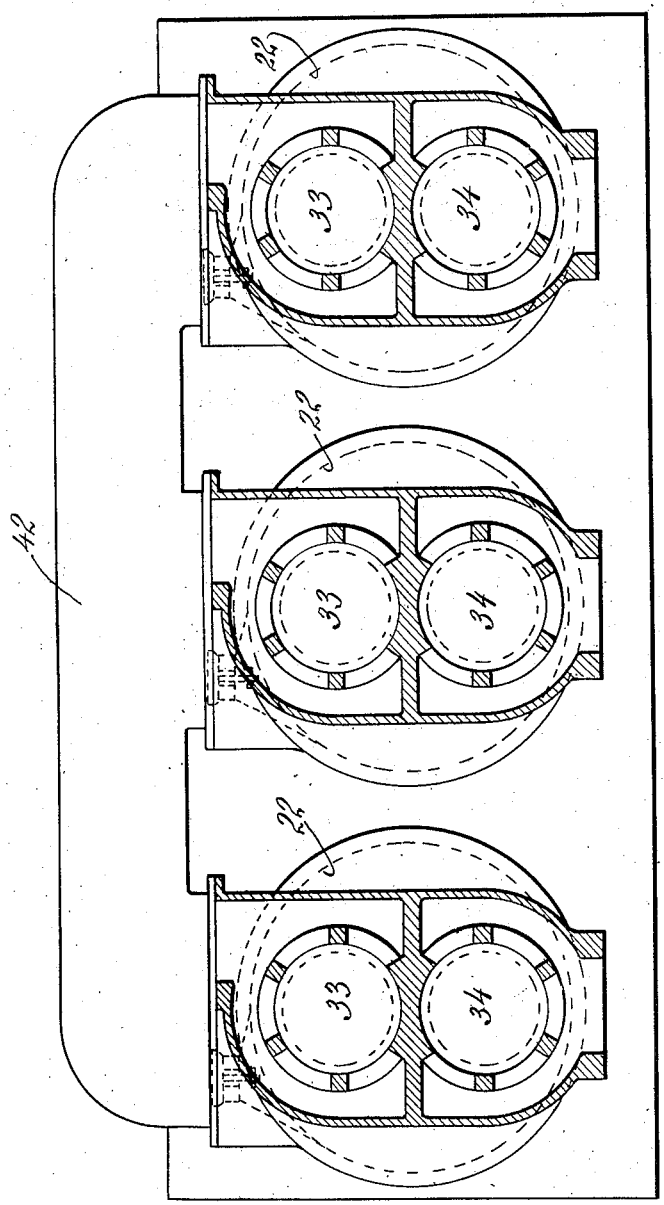
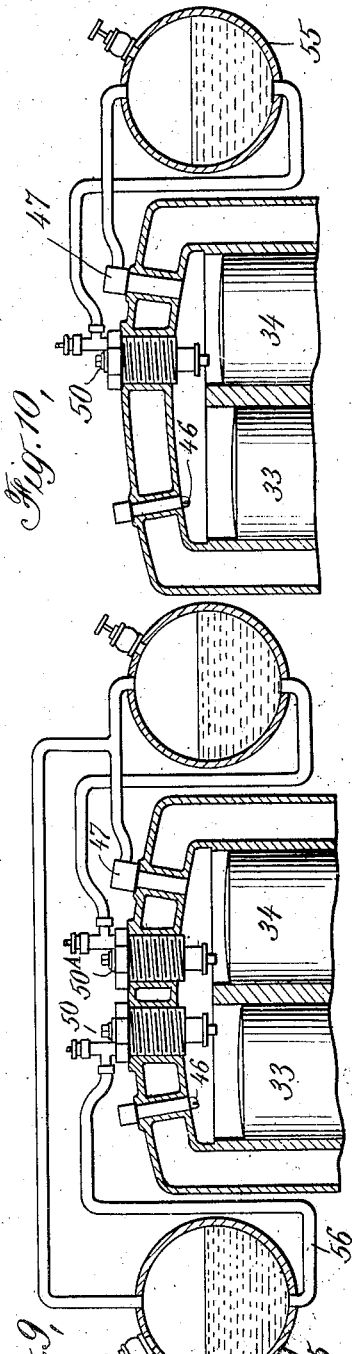

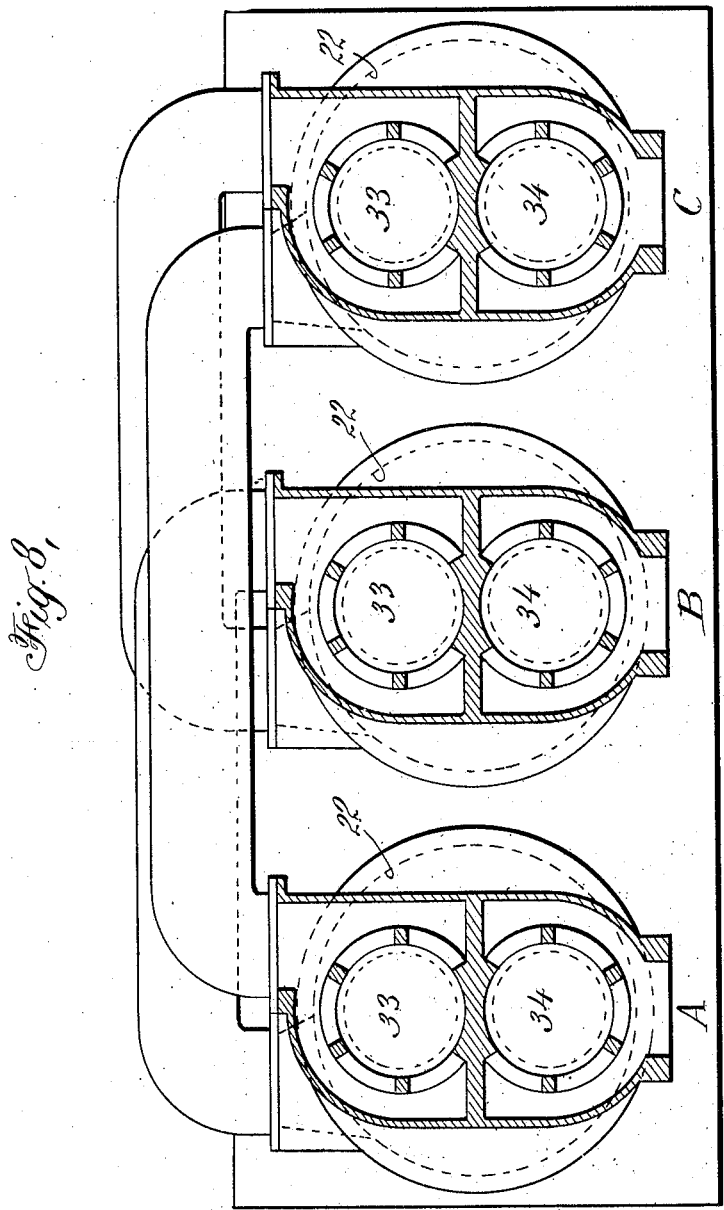

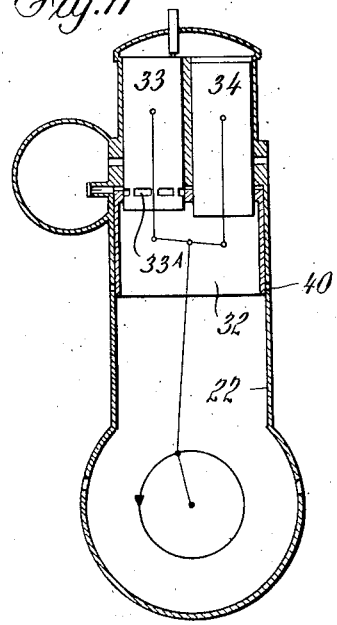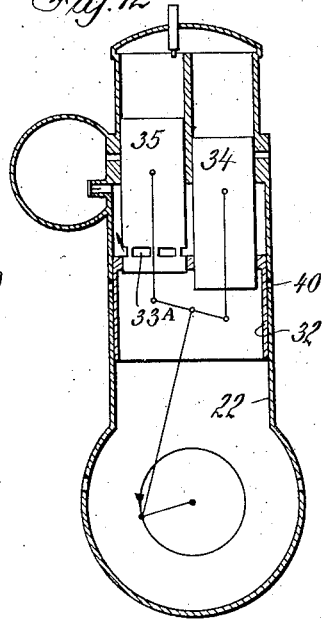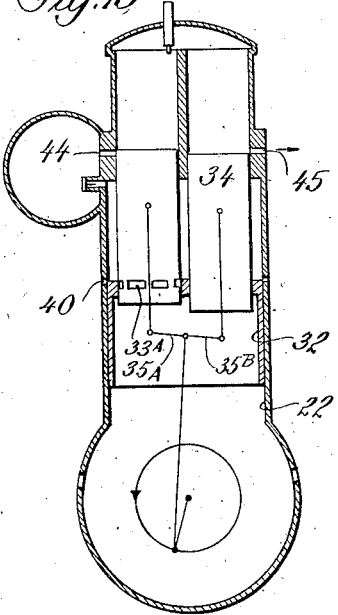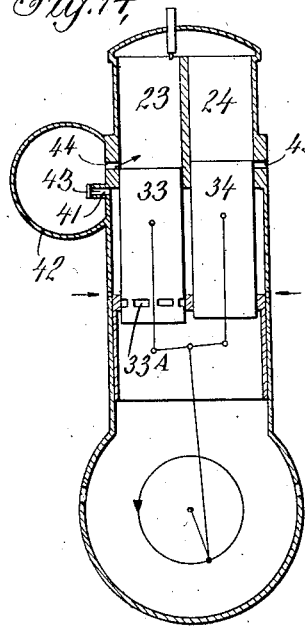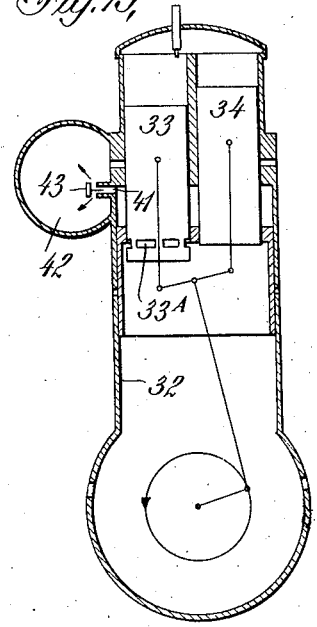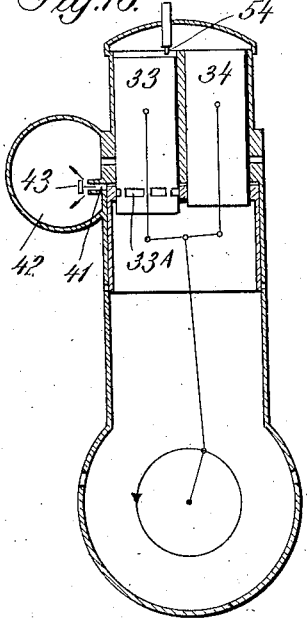

1,682,111

UNITED STATES PATENT OFFICE.

WILHELM B. BRONANDER, OF MONTCLAIR, NEW JERSEY.

INTERNAL-COMBUSTION ENGINE.

Application filed July 13, 1921, Serial No. 484,371. Renewed January 24, 1928.

This invention relates to improvements in internal combustion engines and its object is to provide an efficient engine of simple construction. More specifically the invention relates to an engine having a plurality of pistons so connected to a crank pin as to have correlated movements which control ports and passages in such a way as to produce a desired cycle. The invention also relates to certain features of construction as herein set forth.

Referring to the drawings, Fig. 1 is a sectional end elevation of an engine unit which embodies my invention, together with some of its related parts.

Figs. 2, 3 and 4 are sectional plan views of the same apparatus, the sections being taken on the lines 2—2, 3—3 and 4—4 respectively of Fig. 1.

Fig. 5 is a sectional end elevation of a fuel valve.

Fig. 6 is a sectional side elevation partly in section of the adjusting and regulating mechanism for a fuel valve.

Fig. 7 is a sectional plan view of three interconnected engine units.

Fig. 8 is a similar view of a modified arrangement.

Fig. 9 is a sectional end elevation of the upper part of an engine unit with its connected parts. Fig. 10 is a similar view of a modified arrangement.

Figs. 11–16 are sectional diagrams of an engine unit showing its parts in different positions for the purpose of illustrating the operation.

Like characters of reference designate corresponding parts in all the figures of the drawings.

20 designates a base upon which the various parts of the mechanism are supported. 21 is a casing which forms a compression cylinder 22 and the working cylinders 23 and 24 above it, which are interconnected at the top.

A piston 32 is in the compression cylinder and pistons 33 and 34 which are in the working cylinders extend down through the head of the piston 32. Ports 33$^A$ are provided in the piston 33. These ports 33$^A$ are adapted to establish communication during a desired part of the cycle of operation, between the portions of cylinder 22 which are above and below the head of piston 32. The hollow piston 33 opens directly into hollow piston 32, which in turn opens into the crank case. 30 is the engine shaft and 31 a crank pin. A T-shaped connecting rod 35 connects the crank pin 31 with the piston 32 at 36, and its lateral extensions 35$^A$ and 35$^B$ are connected with the pistons 33, 34 respectively by the supplemental rods 37, 38.

In the cylinder 22 are ports 40 which are uncovered by the piston 32 at the lower end of its stroke, and an outlet port 41 which leads to a chamber 42. This port is provided with a check valve 43. Intake ports 44 lead from this chamber into the cylinder 23 and directly opposite them are exhaust ports 45 which lead from the cylinder 24. 46 is an ignition device and 47 a pressure check valve.

The fuel valve is designated generally by 50. This comprises a plunger 51 which is constructed to form a valve seated on a valve seat 52 by a spring 53, and an end 54 which projects into the path of movement of one of the pistons 33 or 34. Fuel oil or the like is led from a receptacle 55 through a pipe 56 to a passage in the fuel valve leading to an annular space around plunger 51 above the seat 52. This passage is controlled by a needle valve 57 which is arranged to be adjusted both manually and automatically. 58 is a pipe leading from the pressure check valve 47 to the receptacle 55.

On the shank of the needle valve is affixed a worm gear 60 in mesh with which is a worm 61 supported in bearings 62 which permit it to be rotated and to be moved longitudinally. A hand wheel 63 affixed to the worm is provided to enable its rotation. It is obvious that when the worm is prevented from moving longitudinally, its rotation will be imparted to the needle valve. A speed governor 64 suitably connected with the engine shaft, is arranged to shift the worm 61 longitudinally by means of a bell crank 65. This longitudinal movement of the worm also rotates the needle valve. The shank of the needle valve is threaded so that its rotation causes its longitudinal adjustment. These adjustments of the needle valve may be made independently or simultaneously.

Before specifically describing Figs. 7–10 of the drawings I will describe the operation of an engine unit such as that shown in Fig. 1, making especial reference to Figs. 11–16.

The parts are shown in Fig. 11 at the first part of the working stroke with all of the pistons moving downwardly. The ports 33^A are just beginning to rise above the head of piston 32 and during most of the downward stroke they provide passages for air from the crank case through pistons 32 and 33 to that part of cylinder 22 which is above the head of piston 32. This condition is shown more clearly in Fig. 12.

When the parts reach the positions in which they are shown in Figure 13, the ports 33^A are closing but at this time the ports 40 are opening and remain open until piston 32 is raised enough to close them. In this Fig. 13 position exhaust ports 45 are opened by the piston 34 but the intake ports 44 remain closed. This result is accomplished by the angularity of the piston rod extensions 35^A, 35^B out of the horizontal.

When the crank pin has reached its lowermost position,—a condition not shown in the drawings,—these connecting rod extensions are horizontal and both the intake ports 44 and the exhaust ports 45 are open. At that time air under pressure will enter from chamber 42, will flow up through cylinder 23 and down through cylinder 24 to blow out the remaining products of combustion.

Shortly after this the angularity of the connecting rod extension changes and the parts assume the positions of Fig. 14. Now the exhaust ports 45 are closed but the inlet ports 44 are open. Under these conditions air under pressure continues to flow into the cylinders 23, 24, which becomes trapped therein as soon as the piston 33 rises enough to close ports 44. During the upward movement of the pistons this air is compressed to a temperature above the ignition point of the fuel. At the same time air compressed in the cylinder 22 is being forced through port 41 past valve 43 into chamber 42.

When the crank pin nearly has reached the top of its movement the parts are in the positions shown in Fig. 16. The next movement will raise the top of piston 33 against the extension 54 of the fuel valve and the fuel will enter and burn in the cylinders. At the time of maximum pressure in the cylinders, the pressure check valve 47 will open to admit some of the gases to the receptacle 55 to maintain the pressure therein.

Ignition is initiated in the manner described, but in order to facilitate starting the engine when it is cold I prefer to provide an electrically heated plug 46.

If admission of fuel is desired at an earlier part of the cycle, the fuel valve may be placed over piston 34 as shown in Fig. 10. Or one fuel valve 50 may be placed over piston 33 and another 50^A over piston 34 as shown in Fig. 9.

Fig. 7 shows a plurality of engine units like those described with the air pressure chamber 42 extended and connected with the intake ports of all of them.

Figure 8 shows a plurality of units A, B and C like those described, having the air compressing mechanisms cross connected. As shown, an intake manifold from unit A compressor is connected to the working cylinders in unit B, the compressor in unit B supplies air for unit C, and unit C supplies air to unit A. No check valves are necessary in this construction. It will, of course, be understood that the strokes of the various units will be so timed that air will be supplied to the working cylinders at the desired pressure and at the desired intervals in the cycles of operation of the units.

What I claim is:

1. An internal combustion engine comprising a pair of interconnected cylinders, an inlet port in one of said cylinders and an exhaust port in the other cylinder, pistons controlling said ports, a third cylinder, a piston therein, a crank shaft, a crank pin thereon, and a connecting rod carried by said pin and connected to each of said pistons and means for establishing communication between the third cylinder and the first named cylinders.

2. An internal combustion engine comprising a pair of interconnected cylinders, pistons in said cylinders, a third cylinder, a piston therein, a crank shaft, a crank pin thereon, and a single connecting rod carried by said pin and connected to each of said pistons and means for establishing communication between the third cylinder and the first named cylinders.

3. An internal combustion engine comprising a pair of interconnected cylinders, an inlet port in one of said cylinders and an exhaust port in the other cylinder, pistons controlling said ports, a third cylinder surrounding said pistons, a piston therein, a crank shaft, a crank pin thereon, and a connecting rod carried by said pin and connected to each of said pistons and means for establishing communication between the third cylinder and the first named cylinders.

4. An internal combustion engine comprising a pair of interconnected cylinders, an inlet port in one of said cylinders and an exhaust port in the other cylinder, said ports being located adjacent the open ends of the cylinders, pistons controlling said ports, a third cylinder, a piston therein, a crank shaft, means for establishing communication between the third cylinder and the first named cylinders and operative connections between said crank shaft and said pistons, a chamber, means connecting said third cylinder and said chamber, said inlet port leading from said chamber to the first mentioned cylinders.

5. An internal combustion engine comprising two intercommunicating working cylinders, an inlet port in one cylinder and an exhaust port in the other cylinder, pistons in said cylinders, a third cylinder, a piston therein, a crank shaft, a connecting rod carried thereby, operative connections between said connecting rod and said pistons, means for conducting air from the third cylinder to the first mentioned cylinders and means for injecting fuel into the working cylinders.

6. An internal combustion engine comprising two intercommunicating working cylinders, an inlet port in one cylinder and an exhaust port in the other cylinder, pistons in said cylinders, a third cylinder, a piston therein, a crank shaft, a connecting rod carried thereby pivoted to the piston in the third cylinder and having extensions connected to the pistons in the intercommunicating cylinders, means for conducting air from the third cylinder to the first mentioned cylinders and means for injecting fuel into the working cylinders.

7. An internal combustion engine comprising two intercommunicating working cylinders, an inlet port in one cylinder and an exhaust port in the other cylinder, pistons in said cylinders, a third cylinder, a piston therein, a crank shaft, a connecting rod carried thereby pivoted to the piston in the third cylinder and having extensions connected to the pistons in the intercommunicating cylinders.

8. An internal combustion engine comprising two intercommunicating working cylinders, an inlet port in one cylinder and an exhaust port in the other cylinder, pistons in said cylinders, a third cylinder, an inlet port for said third cylinder, a piston in said cylinder controlling said port, an outlet port in said cylinder communicating with the first mentioned cylinders, a crank shaft, and operative connections between said crank shaft and said pistons.

9. An internal combustion engine comprising two intercommunicating working cylinders, an inlet port in one cylinder and an exhaust port in the other cylinder, pistons in said cylinders, a third cylinder, an inlet port for said third cylinder, a piston in said third cylinder controlling said port, an outlet port in said third cylinder communicating with the first mentioned cylinders, a crank shaft, and a connecting rod pivoted to the piston in said third cylinder and having extensions connected to the pistons in the two first mentioned cylinders.

10. An internal combustion engine comprising a pair of intercommunicating working cylinders, an inlet port in one cylinder and an exhaust port in the other cylinder, a port controlling piston in each cylinder, a chamber communicating with said inlet port, a third cylinder communicating with said chamber, an inlet port for said third cylinder, a piston controlling said port, a crank shaft and operative connections between said crank shaft and said pistons.

11. An internal combustion engine comprising a pair of intercommunicating cylinders, an inlet port in one cylinder and an exhaust port in the other cylinder, a port controlling piston in each cylinder, a chamber communicating with said inlet port, a third cylinder communicating with said chamber, a check valve between said third cylinder and said chamber, an inlet port for said third cylinder, a piston controlling said port, a crank shaft and operative connections between said crank shaft and said pistons.

12. An internal combustion engine comprising a pair of intercommunicating cylinders, an inlet port in one cylinder and an exhaust port in the other cylinder, a port controlling piston in each cylinder, a chamber communicating with said inlet port, a third cylinder communicating with said chamber, an inlet port for said third cylinder, a piston controlling said port, the pistons for the first two cylinders extending through the piston in the third cylinder, a crank shaft and operative connections between said crank shaft and said pistons, constructed and arranged to compress gaseous fluid in said chamber as the pistons in said intercommunicating cylinders are moving on their compression stroke.

13. An internal combustion engine comprising a pair of intercommunicating cylinders, an inlet port in one cylinder and an exhaust port in the other cylinder, a port controlling piston in each cylinder, a chamber communicating with said inlet port, a third cylinder communicating with said chamber, an inlet port for said third cylinder, a piston controlling said port, a crank shaft and operative connections between said crank shaft and said pistons, for causing the pistons in the working cylinders to open the exhaust port before the inlet port is opened and to close the exhaust port before the inlet port is closed and for causing the piston in the third cylinder to compress gaseous fluid in the chamber when the inlet port to the first mentioned cylinder is closed.

14. An internal combustion engine comprising a pair of intercommunicating cylinders, an inlet port in one cylinder and an exhaust port in the other cylinder, a port controlling piston in each cylinder, a cylinder surrounding said pistons, a piston therein having openings in the head thereof receiving the first mentioned pistons, a crank shaft and operative connections between said crank shaft and said pistons.

15. An internal combustion engine comprising a pair of cylinders, a piston in each cylinder, a cylinder surrounding said pistons, a piston therein, the head of said piston having openings receiving the first mentioned pistons, a crank shaft and operative connections between said crank shaft and said pistons.

16. An internal combustion engine comprising a pair of intercommunicating cylinders, an inlet port in one cylinder and an exhaust port in the other cylinder, a port controlling piston in each cylinder, a cylinder surrounding said pistons, a piston therein having openings receiving the first mentioned pistons and disposed below said intercommunicating cylinders, means connecting said third cylinder and the first mentioned cylinders, a crank shaft and operative connections between said crank shaft and said pistons.

17. An internal combustion engine comprising a pair of intercommunicating cylinders, an inlet port in one cylinder and an exhaust port in the other cylinder, a port controlling piston in each cylinder, a cylinder surrounding said pistons a piston therein having openings receiving the first mentioned pistons, ports in one of said first mentioned pistons adapted to establish communication from one end to the other of the third cylinder through the piston therein.

18. An internal combustion engine comprising a pair of interconnected cylinders, an inlet port in one of said cylinders and an exhaust port in the other cylinder, pistons controlling said ports, a third cylinder, a piston therein, a crank shaft, a crank pin thereon, and a connecting rod carried by said pin and connected to each of said pistons.

19. An internal combustion engine comprising a pair of interconnected cylinders, an inlet port in one of said cylinders and an exhaust port in the other cylinder, a port controlling piston in each of said cylinders, a compressor cylinder below said interconnected cylinders, a hollow piston in the compressor cylinder, said piston having a head through which the port controlling pistons extend, a crank shaft, a connecting rod carried thereby pivoted to the piston in the compressor cylinder and having lateral extensions connected to the port controlling pistons.

20. An internal combustion engine comprising a pair of interconnected cylinders, an inlet port in one of said cylinders and an exhaust port in the other cylinder, a port controlling piston in each of said cylinders, a compressor cylinder below said interconnected cylinders, a hollow piston in the compressor cylinder, said piston having a head through which the port controlling pistons extend, a crank shaft, a connecting rod carried thereby pivoted to the piston in the compressor cylinder and having lateral extensions connected to the port controlling pistons, means for conducting air from the compressor cylinder to the interconnected cylinders, and means for injecting fuel into the interconnected cylinders.

21. An internal combustion engine comprising a pair of interconnected cylinders, an inlet port in one of said cylinders and an exhaust port in the other cylinder, a port controlling piston in each of said cylinders, a compressor cylinder below said interconnected cylinders, a hollow piston in the compressor cylinder, said piston having a head through which the port controlling pistons extend, a crank shaft, a connecting rod carried thereby pivoted to the piston in the compressor cylinder and having lateral extensions connected to the port controlling pistons, means for conducting air from the compressor cylinder to the interconnected cylinders, and a fuel injector actuated by the upward movement of one of the port controlling pistons at the end of its stroke at a time when the other port controlling piston is not at the end of its upward stroke.

22. An internal combustion engine comprising a pair of interconnected cylinders, an inlet port in one of said cylinders and an exhaust port in the other cylinder, a port controlling piston in each cylinder, a crank shaft, a connecting rod carried thereby having lateral extensions connected to said pistons whereby the pistons are caused to move out of step, and a fuel injector actuated by the upward movement of one of the pistons at the end of its stroke at a time when the other piston is not at the end of its stroke.

23. An internal combustion engine comprising a pair of interconnected cylinders, an inlet port in one of said cylinders and an exhaust port in the other cylinder, a port controlling piston in each cylinder, a crank shaft, a connecting rod carried thereby having lateral extensions connected to said pistons whereby the pistons are caused to move out of step to open the exhaust port before the inlet port is opened and to close the exhaust port before the inlet port is closed, and a fuel injector actuated by the upward movement of one of the pistons at the end of its stroke at a time when the other piston is not at the end of its stroke.

24. An internal combustion engine comprising a pair of interconnected cylinders, an inlet port in one of said cylinders and an exhaust port in the other cylinder, a port controlling piston in each cylinder, a crank shaft, a connecting rod carried thereby having lateral extensions connected to said pistons whereby the pistons are caused to move out of step, a fuel injector actuated by the upward movement of one of the pistons before the completion of the compression stroke and another fuel injector actuated by the upward movement of the other piston after the completion of the compression stroke.

25. An internal combustion engine comprising a pair of interconnected cylinders, an inlet port in one of said cylinders and an exhaust port in the other cylinder, a port controlling piston in each cylinder, a crank shaft, a connecting rod carried thereby having lateral extensions connected to said pistons whereby the pistons are caused to move out of step to open the exhaust port before the inlet port is opened and to close the exhaust port before the inlet port is closed, and a fuel injector actuated by the upward movement of one of the pistons before the completion of the compression stroke and another fuel injector actuated by the upward movement of the other piston after the completion of the compression stroke.

In witness whereof, I have hereunto set my hand this 12th day of July, 1921.

WILHELM B. BRONANDER.